UNITED STATES PATENT OFFICE.

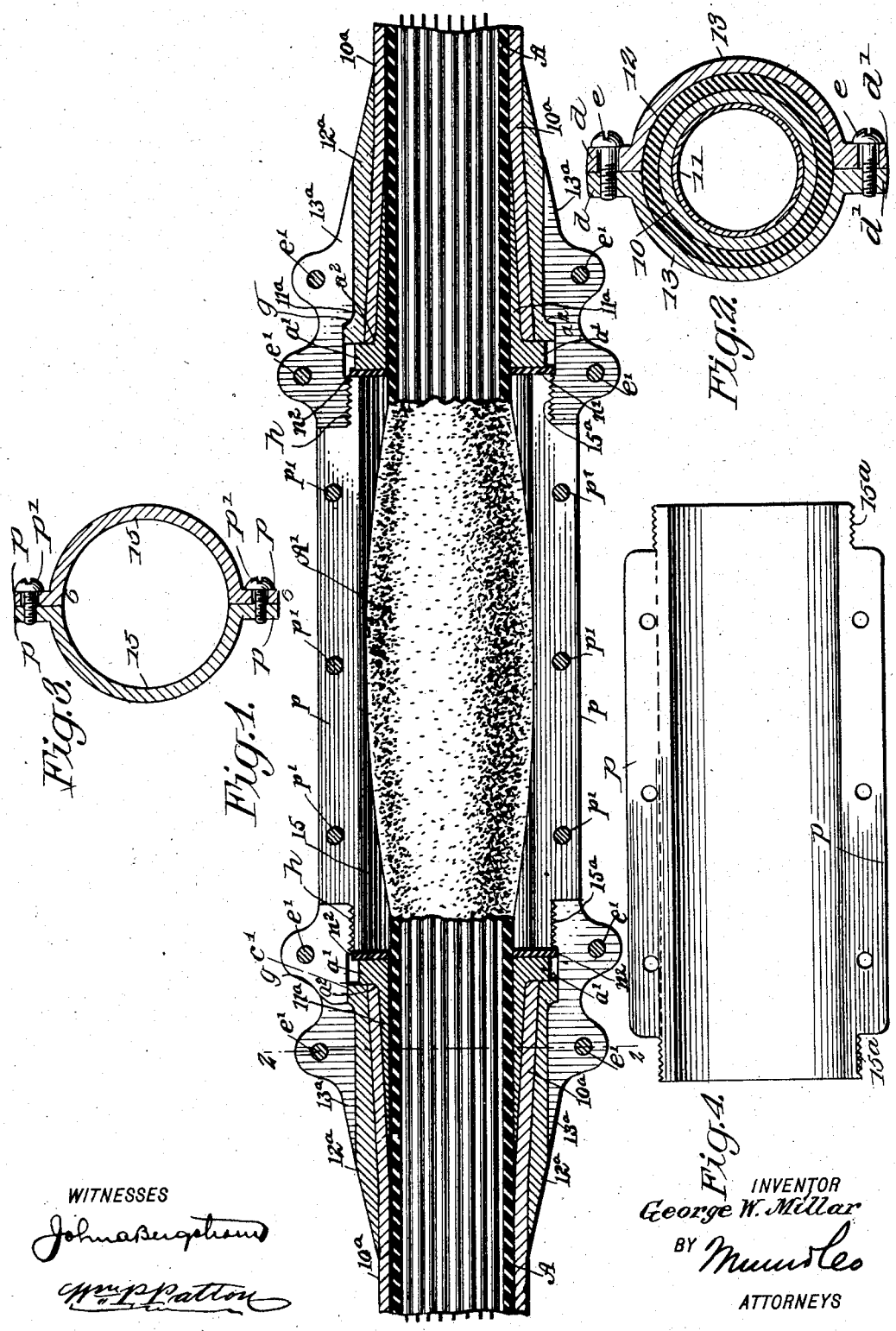
G. W. MILLAR.
PIPE AND CABLE COUPLING AND CASING THEREFOR.
APPLICATION FILED JAN. 19, 1910.
1,028,245.
Patented June 4, 1912.
WITNESSES
INVENTOR
George W. Millar
BY
ATTORNEYS

GEORGE W. MILLAR, OF ST. LOUIS, MISSOURI.

PIPE AND CABLE COUPLING AND CASING THEREFOR.

1,028,245.  Specification of Letters Patent.  Patented June 4, 1912.

Application filed January 19, 1910. Serial No. 538,822.

*To all whom it may concern:*

Be it known that I, GEORGE W. MILLAR, a citizen of the United States, and a resident of St. Louis, in the State of Missouri, have invented a new and Improved Pipe and Cable Coupling and Casing Therefor, of which the following is a full, clear, and exact description.

The purpose of this invention is to provide novel features of construction for a coupling device, that adapt it for effective service as a liquid and fluid tight coupling for an electric cable, the coupling inclosing the joint between the ends of the cable and protecting the insulation thereon.

The invention consists in the novel construction and combination of parts, as is hereinafter described, and defined in the appended claims.

Reference is to be had to the accompanying drawings forming a part of this specification, in which similar characters of reference indicate corresponding parts in all the views.

Figure 1 is a longitudinal sectional view of the improvement; Fig. 2 is a transverse section on line 2—2 of Fig. 1; Fig. 3 is a transverse sectional view of the coupling sleeve; and Fig. 4 is an inner view of a section of said sleeve.

In placing electric conducting wires underground, it is according to approved practice found essential that the wires be incased in lead pipes, for the protection of the insulation that covers the wires forming the cable. In such cables, where a junction is effected between two portions thereof, the separate wires composing the main cable are each individually connected, separately soldered, and covered with a suitable insulating material, then all are lapped and in some cases twisted together, forming a splice joint for the main cable sections, the joint being covered with suitable insulating material. For a proper protection of the splice joint in a main electric cable, provision is made to incase the joint that is thicker than the body of the cable as well as said cable body.

The lead pipe section $10^a$, $10^a$ may have any necessary diameter, and each terminates in a true end wall, into which a thimble $11^a$ is forcibly inserted, until the radial collar $a'$ thereon abuts against a respective end of the lead pipe sections, this insertion of the thimbles giving the end portions of the pipe sections coniform shape. On each tapering end portion of the pipe sections $10^a$ and sleeve $12^a$, is forcibly mounted, said sleeves each having a radial flange $c'$ on the end nearest the collar $a'$, against which said flange is impinged. The ends of a main electric cable A, formed of a plurality of electric conducting wires, are now respectively projected through and outside of the ends of the lead pipe sections $10^a$ ready for splicing, which operation is conducted in approved manner, and the thickened joint or splice $A'$ is coated with a suitable insulating material.

Upon each sleeve $12^a$ a coupling nut formed in two half sections $13^a$, is clamped by screws $e'$ passing through ears on said sections, as shown in Fig. 1, where one half section of each nut appears. Each coupling nut has its bore increased in diameter producing an annular shoulder $g$ that contacts with the radial flange $c'$ of the sleeve $12^a$, and in said bore forward of the shoulder $g$, a screw thread $h$ is formed. Two washers $n^2$ are respectively mounted upon the cable A near an end of the joint $A'$, said washers serving to dispose the cable centrally in the coupling nuts, as indicated in Fig. 1.

A completing detail consists of a casing sleeve formed in two sections 15, 15, said sections that are half circular in cross section being adapted for secured connection at their meeting edges, by provision of perforated flanges $p$, disposed oppositely therein in pairs, and which receive clamping screws $p'$, as shown in Fig. 1. On each end of the two part casing sleeve, a cylindrical threaded pipe $15^a$ is formed, said nipples being adapted for threaded engagement within the coupling nuts, the ends of which extend beyond the washers $n^2$ for the reception thereof, as shown in Fig. 1. The casing sections 15, are secured together over the splice joint $A'$, said sections having their ends engaged with the washers $n^2$ before the coupling nuts formed of the half sections $13^a$ are secured in place, but may be loosely mounted on the sleeves $12^a$. The coupling nuts are now moved into engagement with the ends of the nipples $15^a$, and are screwed thereon, after which said nuts are clamped upon the sleeves $12^a$, which completes the incasement of a main electric cable at a splice thereon.

Having thus described my invention, I claim as new, and desire to secure by Letters Patent:

1. A coupling, embodying two thimbles having tapered exterior walls, and radial collars at the inner ends thereof, two pipe sections wherein the thimbles are driven for coniform expansion of said pipe ends, two sleeves having coniform bores and driven upon the pipe ends, said sleeves having flanges engaging the collars of the thimbles, two bisected coupling nuts each clamped upon a sleeve and having an internal thread at one end, and a two-part casing sleeve having a threaded nipple at each end, that engages the internal thread of a corresponding coupling nut.

2. A coupling comprising tapering thimbles having collars at their inner ends and adapted to be driven into the pipe sections to be coupled with their collars in engagement with the ends of the pipe sections, sleeves having flanges at their inner ends and adapted to be driven on the pipe sections with their flanges abutting against the collars of the thimbles, nuts on the sleeves and having shoulders engaging the flanges of the said sleeves, and a two-part casing having reduced and threaded ends with which the said nuts engage.

3. A coupling, comprising tapering thimbles having collars at their inner ends and adapted to be driven into the pipe sections to be coupled, sleeves adapted to be driven onto the pipe sections, and having flanges at their inner ends engaging the collars of the thimbles, nuts having bores of different diameters forming shoulders, the bore at the inner end being the larger and the portion beyond the shoulder being threaded, the said nuts fitting upon the sleeves with the shoulders abutting against the flanges of the sleeves, a two-part casing having threaded ends engaged by said nuts and provided with apertured flanges, and screws engaging the apertures of said flanges.

In testimony whereof I have signed my name to this specification in the presence of two subscribing witnesses.

GEORGE W. MILLAR.

Witnesses:
    JAMES M. KENNIDY,
    A. B. VIRTUE.

---

Copies of this patent may be obtained for five cents each, by addressing the "Commissioner of Patents, Washington, D. C."